C. R. HARRIS.

Assignor to himself and W. SILVERMANN.

BUCKLE.

No. 11,039. Reissued Nov. 5, 1889.

Witnesses
G. F. Downing
V. E. Hodges

Inventor
Charles R. Harris.

By his Attorney
H. A. Seymour.

N. PETERS, Photo-Lithographer, Washington, D. C.

UNITED STATES PATENT OFFICE.

CHARLES R. HARRIS, OF WILLIAMSPORT, PENNSYLVANIA, ASSIGNOR TO HIMSELF AND WILLIAM SILVERMANN, OF SAME PLACE.

BUCKLE.

SPECIFICATION forming part of Reissued Letters Patent No. 11,039, dated November 5, 1889.

Original No. 345,967, dated July 20, 1886. Application for reissue filed January 25, 1888. Serial No. 261,801.

*To all whom it may concern:*

Be it known that I, CHARLES R. HARRIS, of Williamsport, in the county of Lycoming and State of Pennsylvania, have invented new and useful Improvements in Suspender and other Buckles, of which the following is a full, clear, and exact description.

This invention relates to suspender and other like buckles, or combined buckles and hooks, and in which, ordinarily, a fixed toothed bar in the rear of the body or frame of the buckle is used. It differs in important respects from the buckle for which Letters Patent No. 314,018 were issued to me March 17, 1885, and in which a fixed bar of hollow construction having teeth along both of its edges for operation in connection with a presser-bar forming part of the folding or closing portion of the buckle was used; also in which the folding or closing portion of the buckle was made, when closed, to loop over or overlap the hook of the buckle; and the present invention consists in various novel constructions and combinations of parts, substantially as hereinafter described, the same including a double hook, or hook within a hook, a tubular hinged construction of the opening and closing portion of the buckle adapted to receive and hold the ends of the wires of which the two main portions of the buckle are composed, a flat cross-bar with single row of inclined teeth, a presser-bar formed of double wire, a plate fastened to the presser-bar and provided with teeth, and an indented construction of the sides of the buckle-frame to keep the cross-bar from slipping.

Reference is to be had to the accompanying drawings, forming a part of this specification, in which similar letters of reference indicate corresponding parts in all the figures.

Figure 1:
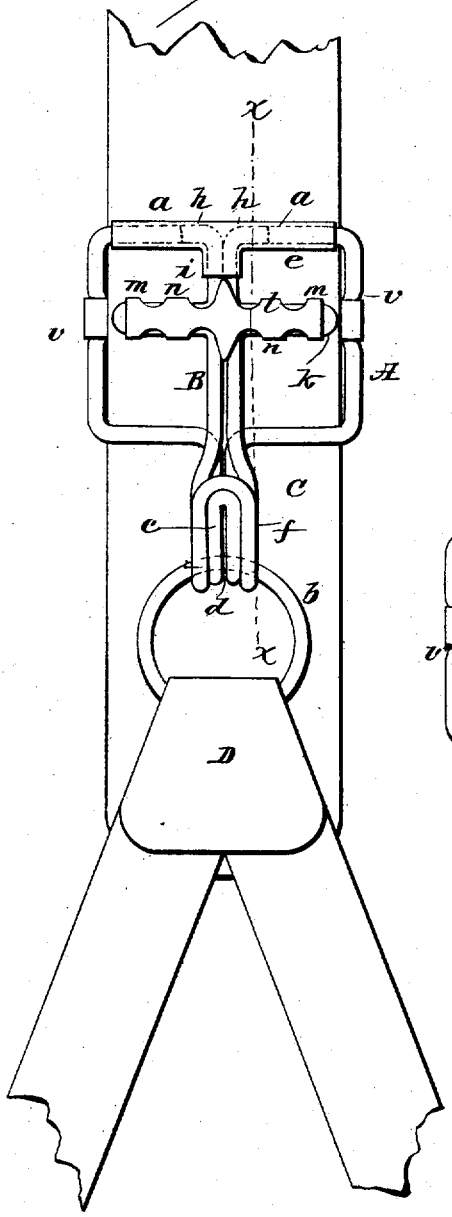
Figure 2:
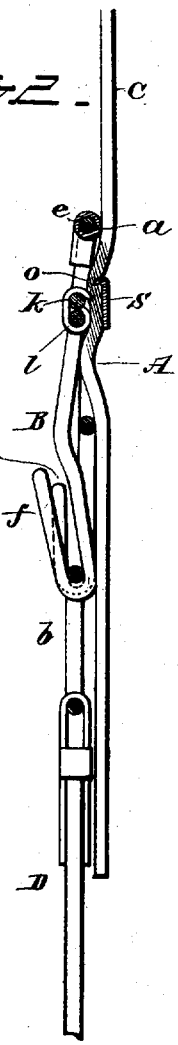
Figure 3:
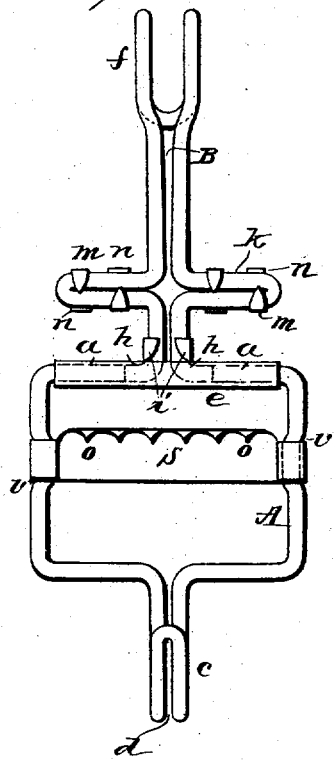

Figure 1 represents a front view of a suspender-strap in part, with a buckle embodying my invention applied, and showing in part the ring-engaging ends of the suspenders attached. Fig. 2 is a partly-sectional edge view of the same, the section being taken upon the line *x x* in Fig. 1. Fig. 3 is an inner face view of the buckle as seen when thrown open.

The buckle is principally composed of two independent main parts A and B, the one A including the frame or body part of the buckle, and being made of spring-wire, and the other part B, which is also made of spring-wire, or mainly so, including the opening and closing portion of the buckle.

C indicates the main strap or web of the suspenders, or one of them, on which the buckle is adjusted, and D the front detached end portion of the suspenders, with attached ring *b*, by which said end parts are connected with the hook or hooks of the buckle.

The frame or body A of the buckle is constructed at its lower end so that the wire of which it is composed forms a spring doubled-wire hook *c*, the sides of which are separated from each other, as at *d*. The upper ends *a a* of said frame are entered within a tubular hinge or sleeve *e*, to which the spring-wire of the folding or closing portion B is attached, and said wire portion is constructed at its lower or outer end to form a larger spring doubled wire hook *f*, of sufficient capacity, so that when closed down to its place on the web or strap C, as shown in Figs. 1 and 2, it will receive the smaller hook *c* within it, and so that the larger hook *f* will spring over the smaller one *c*, and the spring or friction of the one hook passing over the other will tend to keep both hooks and main portions A B of the buckle in position when closed. Said construction also provides for the elasticity of the smaller hook *c* at its top or outer end and the elasticity of the larger hook *f* at its back or bottom securely holding the ring *b* of the suspender-strap end portion D in place, and to keep said ring from working out of place. This construction likewise, forms, when the buckle is closed, a compound hook *c* and *f* of great strength.

The tubular hinge or sleeve *e* receives within it the four ends *a a* and *h h* of the frame A and front portion B of the buckle, the opening and closing portion B of the buckle turning upon the end portions *a a*, and the bent end parts *h h* being engaged with the sleeve *e* by a downward socket-like projection *i* therefrom. This projection *i*, lapping around the upper terminal portions of the doubled wire of which the portion *b* is mainly composed, and which includes the presser-bar portion *k* of said opening and closing section B of the buckle, serves to hold the wire firm, and it is arranged so that the longitudinal seam of the sleeve *e* is prevented from exposing its raw edge on top, which would make a rough finish.

The wire of which the portion B is composed is doubled and bent, so as not only to form the doubled-wire hook *f*, but also a doubled-wire pressing-bar *k*, as shown in Fig. 3, and which will have great strength. To give said presser-bar a better hold when closed upon the web C of the suspenders, it has combined with it a metal plate *l*, which is applied as a cover to the outer surface of the arms forming the presser-bar and clinched around said arms, as by bending over and down toothed projections *m*, and which is provided with other teeth *n*, standing out from the under side of the presser-bar, so as to pierce and take hold on the web C, opposite the fixed toothed bar S on the frame or body A of the buckle, thereby giving a secure toothed hold on both sides of the web when the buckle is closed on the latter, and held closed by the engagement of the ring *b* of the end portion D of the suspenders with the two hooks *c f*, as shown in Figs. 1 and 2. In some cases the toothed plate *l* may be omitted from the presser-bar.

The fixed bar S is of a flat construction, and has its teeth *o*, which are set inclining downward, arranged along its upper edge to hold on to the web C when pressed into place by the presser-bar on the opposite side of the web. To keep this flat cross-bar S from sliding up the buckle-frame when the suspenders have a heavy strain thrown upon them, said bar is held to its place on the frame by indenting the opposite sides of the latter and turning the ends of the bar over the crooks or indentations *v v*, made in the frame.

The crooks or indentations *v v* are not of curvilinear form throughout their length, but are made so as to present straight continuations of the buckle-frame to form straight bearings for the flat cross-bar S at its ends, which are turned over said straight indented parts of the sides of the frame, such straight indented parts corresponding in length with the width of said bar at its ends.

The tubular sleeve *e*, which forms the hinge or joint portion of the buckle, instead of being in a single piece, as represented, may be of a sectional construction—that is, be formed in two separate pieces or sleeves, one on each side; nor is the socket-like projection *i* absolutely necessary for attaching the folding portion B of the buckle to the tubular sleeve.

The buckle is applied to and adjusted up or down the web of the suspenders as other suspender-buckles provided with a hook on the lower end, fixed bar on their frames, and a presser-bar attached to the opening and closing portion of the buckle are applied and adjusted.

Having fully described my invention, I claim as new and desire to secure by Letters Patent—

1. In a buckle, the combination, with a frame or body having a cross-bar therein, of a clamping-jaw arranged with relation to said cross-bar to clamp the fabric between their adjacent faces, said clamping-jaw being provided with a sleeve that encircles one end of the frame and forms a hinged joint, and also provided with a locking device, substantially as set forth.

2. A wire buckle consisting of a frame having a hook that extends below the frame, and a folding or closing portion provided with a hook constructed to receive the frame-hook within it, thereby forming a compound wire hook at a point below the frame, substantially as set forth.

3. The frame A of a buckle, having at its one or lower end a spring double-wire hook *c*, in combination with the folding or closing front portion B of the buckle, provided with a spring double-wire hook *f*, constructed and arranged to receive and hold the hook *c* within it, essentially as described.

4. The tubular sleeve *e* of the buckle, in combination with the wire buckle-frame A and the wire folding and closing portion B, having their ends *a a* and *h h*, respectively, both entered within said sleeve in like axial relation with one another and with the sleeve, substantially as specified.

5. The tubular sleeve *e* of the buckle, provided with a socket-like projection *i*, in combination with the wire buckle-frame A and wire folding and closing portion B, having their ends *a a* and *h h* entered within said sleeve part, substantially as specified.

6. In combination with the frame A of the buckle, the wire folding and closing portion B of the buckle bent to form a doubled-wire presser-bar *k*, essentially as shown and described.

7. The combination, with the doubled-wire presser-bar *k*, of the plate *l*, secured thereto and provided with teeth *n*, substantially as specified.

8. The flat fixed cross-bar S, in combination with the frame A, having indentations *v* in its sides made to form straight indented continuations of the sides of the frame of a length corresponding with the width of said bar at its ends for the reception and hold of the bar, essentially as described.

9. The fixed cross-bar S, provided with downward-inclined teeth *o* along its one or upper edge, in combination with the presser-bar of the buckle, substantially as specified.

CHARLES R. HARRIS.

Witnesses:
WM. P. PATTON,
G. F. DOWNING.